US012224543B2

(12) United States Patent
Poirier

(10) Patent No.: US 12,224,543 B2
(45) Date of Patent: Feb. 11, 2025

(54) ELECTRICAL CONNECTOR INSTALLATION TOOL

(71) Applicant: Hubbell Incorporated, Shelton, CT (US)

(72) Inventor: Robert Michael Poirier, Bedford, NH (US)

(73) Assignee: Hubbell Incorporated, Shelton, CT (US)

( * ) Notice: Subject to any disclaimer, the term of this patent is extended or adjusted under 35 U.S.C. 154(b) by 475 days.

(21) Appl. No.: 16/432,578

(22) Filed: Jun. 5, 2019

(65) Prior Publication Data

US 2019/0372289 A1 Dec. 5, 2019

Related U.S. Application Data

(60) Provisional application No. 62/680,872, filed on Jun. 5, 2018.

(51) Int. Cl.
*H01R 43/027* (2006.01)
*H01R 4/50* (2006.01)

(52) U.S. Cl.
CPC ......... *H01R 43/027* (2013.01); *H01R 4/5083* (2013.01)

(58) Field of Classification Search
CPC ................ H01R 43/027; H01R 43/048; H01R 43/0427; H01R 43/058; H01R 4/5083; H01R 9/0518; H01R 9/0524
See application file for complete search history.

(56) References Cited

U.S. PATENT DOCUMENTS 2,182,663 A * 12/1939 Eby ........................ B21D 13/04 100/232
3,017,905 A * 1/1962 Klein ................ H01R 43/0427 140/113
3,230,713 A * 1/1966 McDurmont ...... H01R 43/0427 91/468
3,326,304 A * 6/1967 Johnson ................ A01G 3/033 173/169
(Continued)

FOREIGN PATENT DOCUMENTS

CA 2711354 A1 * 1/2011 ........... H01R 43/027
CN 102059686 A 5/2011
(Continued)

OTHER PUBLICATIONS

PCT/US2019/035598 International Search Report and Written Opinion dated Sep. 4, 2019 (12 pages).
(Continued)

*Primary Examiner* — Jeffrey T Carley
(74) *Attorney, Agent, or Firm* — Robinson + Cole LLP

(57) ABSTRACT

A connector installation tool includes an elongated body, a handle, a battery, and a c-shaped tool head. The elongated body includes a first end, a second end, and an axis extending therebetween. The handle includes a switch and is positioned proximate the first end. The switch is moveable between a first position and a second position. The battery is supported on the body and is configured to provide power to an actuator when the switch is in the first position. The C-shaped tool head is positioned proximate the second end. The c-shaped tool head includes a stop surface and a ram, and the ram is extendable toward the stop surface.

12 Claims, 6 Drawing Sheets

(56) References Cited

U.S. PATENT DOCUMENTS

| | | | | |
|---|---|---|---|---|
| 3,773,375 | A * | 11/1973 | Nehls | E04D 13/106 37/268 |
| 5,125,158 | A * | 6/1992 | Casebolt | B26B 15/00 30/228 |
| 6,230,542 | B1 | 5/2001 | Frenken | |
| 6,446,482 | B1 * | 9/2002 | Heskey | H01R 43/0427 72/453.16 |
| 7,254,982 | B2 * | 8/2007 | Frenken | B25B 27/10 60/477 |
| 7,614,139 | B2 * | 11/2009 | Itrich | H01R 4/5083 29/751 |
| 8,276,430 | B2 * | 10/2012 | Barezzani | B25B 27/146 72/453.15 |
| 9,160,128 | B2 | 10/2015 | Chadbourne et al. | |
| 10,535,968 | B2 * | 1/2020 | Stevens | H01R 43/26 |
| 2003/0188566 | A1 * | 10/2003 | Lefavour | B25B 27/10 72/453.16 |
| 2004/0177495 | A1 | 9/2004 | Itrich | |
| 2005/0039327 | A1 | 2/2005 | Itrich | |
| 2007/0214860 | A1 * | 9/2007 | Frenken | H01R 43/0428 72/453.01 |
| 2007/0240301 | A1 * | 10/2007 | Johnson | H01R 43/027 29/748 |
| 2010/0107905 | A1 | 5/2010 | Stull et al. | |
| 2014/0190715 | A1 | 7/2014 | Wong et al. | |
| 2015/0263472 | A1 * | 9/2015 | Sneath | H01R 43/0427 72/453.16 |
| 2015/0283693 | A1 * | 10/2015 | Chiasson | B25B 27/146 173/168 |
| 2017/0087709 | A1 * | 3/2017 | Barezzani | B25F 5/005 |
| 2017/0252912 | A1 * | 9/2017 | Barezzani | B23D 15/14 |
| 2018/0331435 | A1 * | 11/2018 | Murugiah | H01R 43/26 |
| 2019/0232481 | A1 * | 8/2019 | Skinner | B25B 27/10 |

FOREIGN PATENT DOCUMENTS

| | | | | |
|---|---|---|---|---|
| CN | 104797381 A | | 7/2015 | |
| WO | WO-2014193765 A1 | * | 12/2014 | B23D 15/14 |

OTHER PUBLICATIONS

PCT/US2019/035598 Supplementary European Search Report dated Jan. 20, 2022.

Office Action issued by the China National Intellectual Property Administration, on Aug. 31, 2023 in corresponding Chinese Patent Application No. 201980041569.3. (10 pages).

Search Report and Written Opinion issued on Jun. 8, 2023, by the Brazilian Patent Office in corresponding Brazilian Patent Application No. 112020024717-0 and an English translation. (7 pages).

Communication pursuant to Article 94(3) EPC issued on Jun. 5, 2023, by the European Patent Office in corresponding European Patent Application No. 19814744.9. (4 pages).

Rejection Decision issued on Dec. 12, 2023, by the China National Intellectual Property Administration in corresponding Chinese Patent Application 201980041569.3 and an English translation of the Decision. (17 pages).

* cited by examiner

ELECTRICAL CONNECTOR INSTALLATION TOOL

REFERENCE TO RELATED APPLICATION

This application claims the benefit of prior-filed, U.S. Provisional Patent Application No. 62/680,872, filed Jun. 5, 2018, the entire contents of which are incorporated by reference.

TECHNICAL FIELD

The present disclosure relates to a connector installation tool, and more specifically, to a pole-mounted, electrical connector installation tool.

BACKGROUND

Electrical connector installation tools may be operated to install a connector, such as a wedge connector, onto multiple conductors. Conventional installation tools contain a ram that is driven by ignition of a charge cartridge. The charge cartridge may contain a powder that is ignited when a case is struck (e.g., by a hammer).

SUMMARY

In one embodiment, a connector installation tool includes an elongated body, a handle, a battery, and a c-shaped tool head. The elongated body includes a first end, a second end, and an axis extending therebetween. The handle includes a switch and is positioned proximate the first end. The switch is moveable between a first position and a second position. The battery is supported on the body and is configured to provide power to an actuator when the switch is in the first position. The c-shaped tool head is positioned proximate the second end. The c-shaped tool head includes a stop surface and a ram, and the ram is extendable toward the stop surface.

In another embodiment, a connector installation tool includes an elongated body, a handle, a battery, and a tool head. The elongated body includes a first end, a second end, and an axis extending therebetween. The handle includes a switch and is positioned proximate the first end. The switch is moveable between a first position and a second position. The battery is supported on the body and is configured to provide power to an actuator when the switch is in the first position. The tool head includes a stop surface and a ram. The ram is extendable toward the stop surface. The tool head is supported for pivoting movement about the second end of the body.

In yet another aspect, a connector installation tool includes a body having a first end and a second end. A conduit extends between the first end and the second end. The connector installation tool also includes a handle having a switch and positioned proximate the first end. The switch is moveable between a first position and a second position. A battery is supported on the body and in electrical communication with the switch. A pressurized fluid is configured to flow through the conduit when the switch is in the first position. The connector installation tool further includes a tool head positioned proximate the second end. The tool head includes a stop surface and a ram. The ram is extendable toward the stop surface.

Other aspects of the disclosure will become apparent by consideration of the detailed description and accompanying drawings.

DETAILED DESCRIPTION

Figure 1:
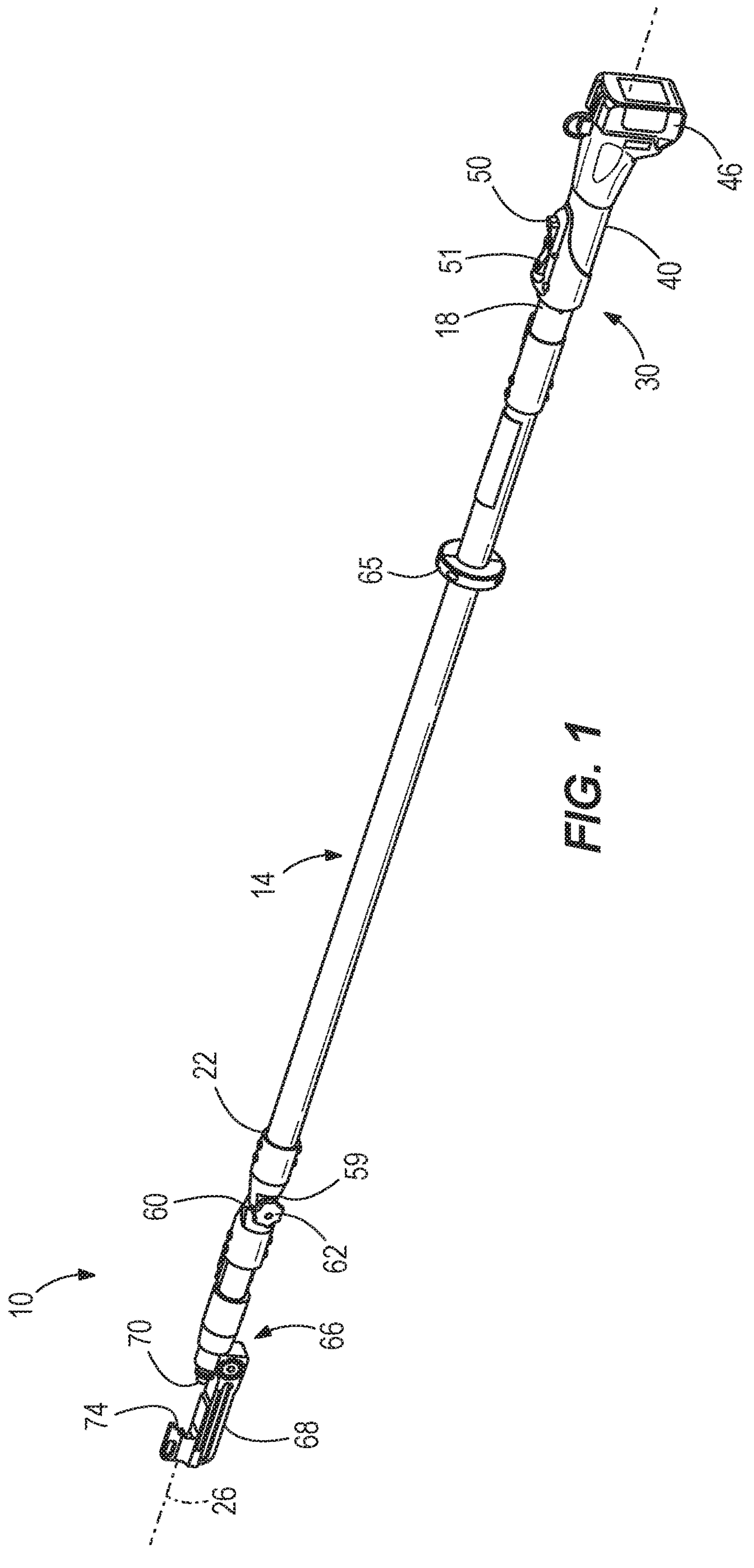
FIG. 1 is a perspective view of a connector installation tool.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to an installation tool for installing a connector between two electrical conductors. In some embodiments, the connector installation tool applies a force to insert a wedge connector between two electrical conductors and form an electrical connection therebetween. The tool includes an elongated body to permit the working end to install the connector in locations that are difficult to access.

As shown in FIGS. 1-4, the installation tool 10 includes a body 14 having a first end 18, a second end 22, and an axis 26 extending between the first end 18 and the second end 22. In the illustrated embodiment, a handle 30 is positioned proximate the first end 18 and a tool accessory or head 34 is coupled to the second end 22. In some embodiments, the body 14 is generally cylindrical in shape, and may be at least six feet long.

The handle 30 includes a terminal (not shown) that may receive a battery 46. A grip 40 is positioned at least partially around the outer periphery of the handle 30. The grip 40 may have a higher coefficient of friction than the rest of the handle 30. A user's hand is configured to be placed on the grip 40 and the higher coefficient of friction helps to limit the handle 30 from slipping in the user's hand. A switch 50 is positioned proximate the grip 40 on the outer periphery of the handle 30. In the illustrated embodiment, the switch 50 is a trigger. The trigger 50 is configured to allow current to pass while the trigger 50 is engaged, and the trigger 50 is configured to block current while the trigger 50 is released. In other embodiments, the switch may be a lever moveable between a first or closed position configured to allow current to pass and a second or open position configured to block current from passing. In the illustrated embodiment, the installation tool 10 further includes a lock or safety 51 that must be actuated from an open position to a closed position to permit the trigger 50 to be actuated.

The head 34 is coupled to the second end 22 of the body 14. In the illustrated embodiment, the second end 22 of the body 14 includes a projection 59 and the head 34 includes a projection 60 that is pivotably coupled to the projection 59, e.g., by a threaded fastener 62 extending through the projections 59, 60. The threaded fastener 62 may rotate in a first or loosening direction in order to allow the head 34 to pivot with respect to the body 14. The head 34 may pivot through an angle θ relative to the axis 26 of the body 14. In the illustrated embodiment, the head 34 may pivot from a first position in which the head 34 is aligned with the axis 26 to a second position in which the head 34 is inclined with respect to the axis 26 of the body 14. In some embodiments, the head 34 may pivot through a range of 180 degrees. For example, the head 34 may pivot through an angle θ between +90 degrees and −90 degrees with respect to the axis 26, allowing the head 34 to be positioned orthogonally with respect to the body 14. In other embodiments, the head 34 may pivot more or less than 180 degrees. After positioning the head 34 in a desired orientation, the threaded fastener 62 is rotated in a second or tightening direction to secure the head 34 with respect to the body 14.

Figure 2:
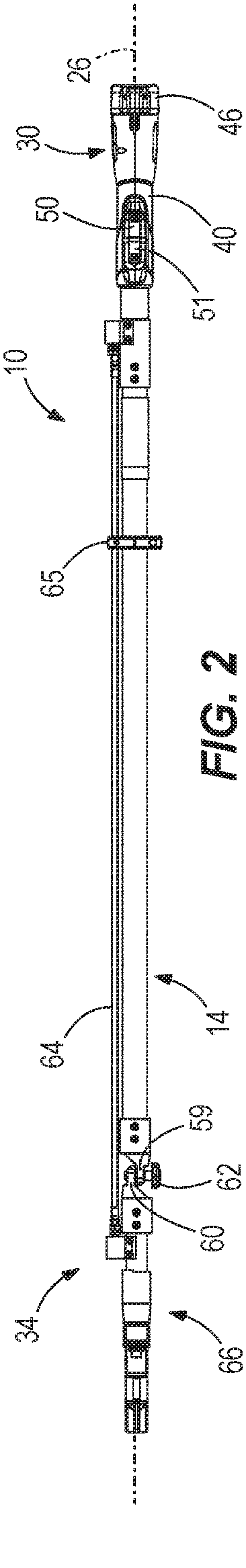
FIG. 2 is a top plan view of the connector installation tool of FIG. 1.
Figure 3:
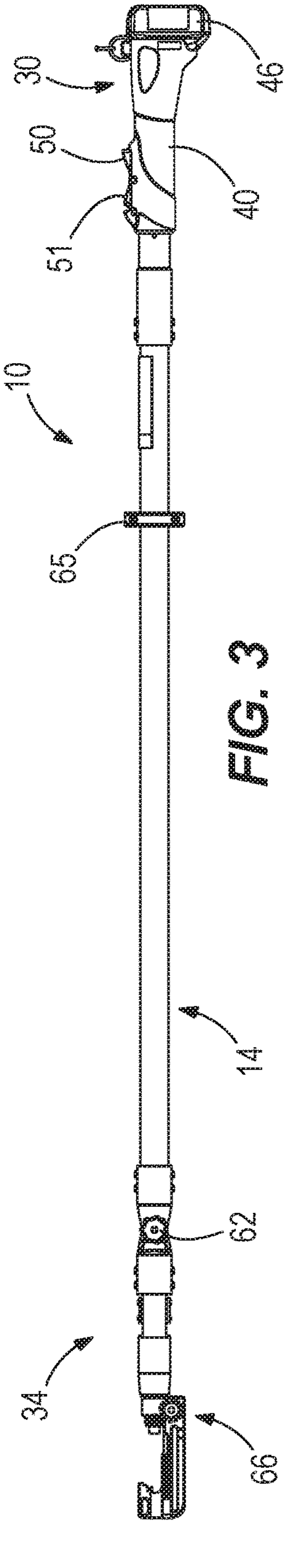
FIG. 3 is a side elevation view of the connector installation tool of FIG. 1.
Figure 4:
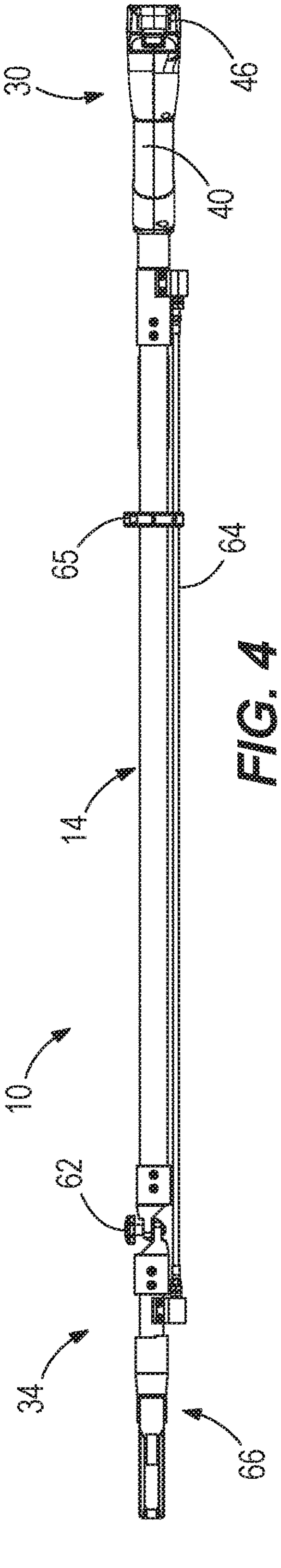
FIG. 4 is a bottom plan view of the connector installation tool of FIG. 1.
Figure 5:
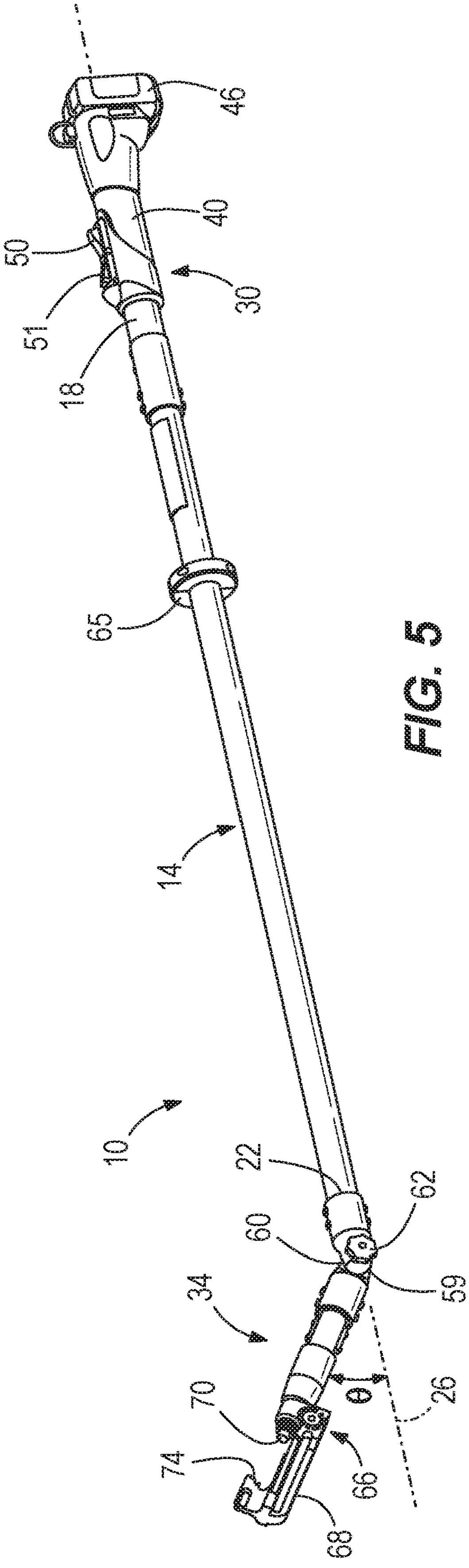
FIG. 5 is a perspective view of the connector installation tool of FIG. 1, illustrating a tool head pivoted with respect to a tool body.

The installation tool 10 further includes a motor and a pump (both not shown). In some embodiments, the motor and pump are positioned within the body 14. The motor is selectively operated by current from the battery 46 based on actuation of the trigger 50. While the trigger 50 is engaged, current flows to the motor, thereby powering the motor. The motor, in turn, operates a fluid pump. The pump may be fluidly coupled to a reservoir (not shown) and a conduit or hose 64 (FIG. 2). In the illustrated embodiment, the hose 64 is positioned outside of the body 14. The pump drives fluid (e.g., hydraulic fluid) from the reservoir through the hose 64 to the head 34. A ring 65 is disposed around the body 14 and is coupled to the hose 64 to prevent the hose from twisting around the body 14.

Figure 6:
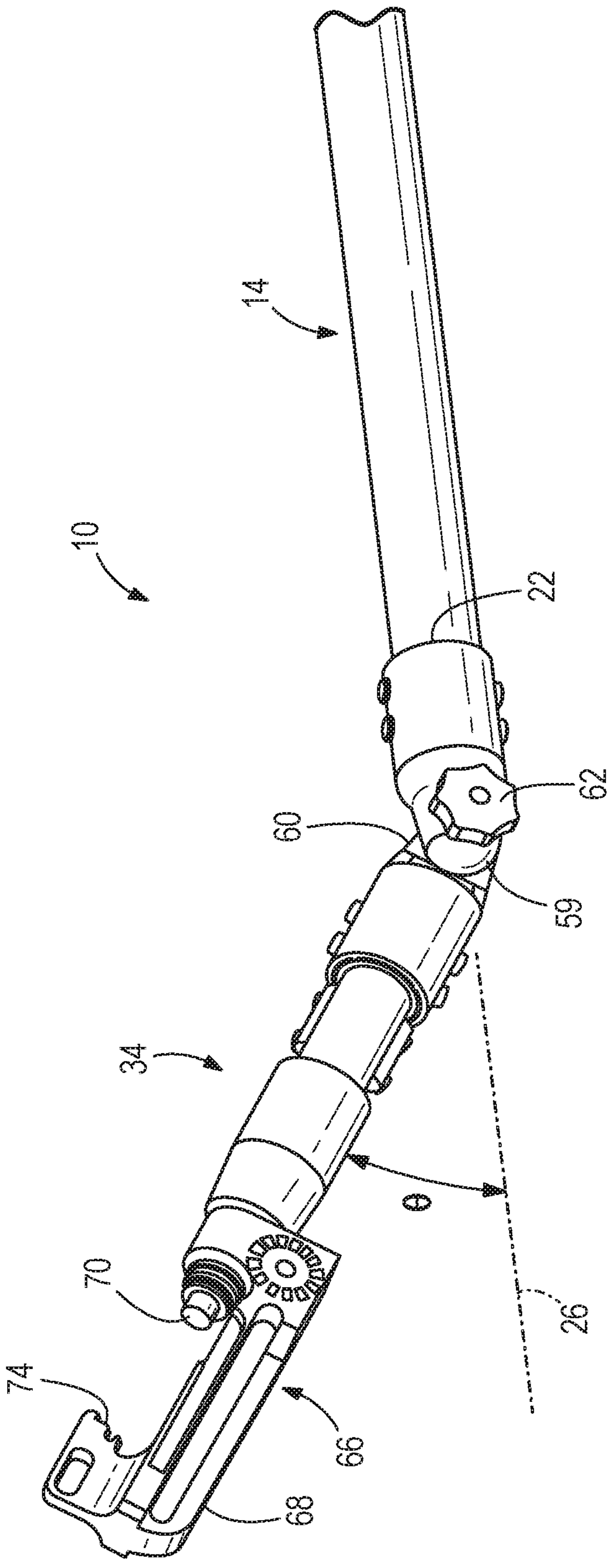
FIG. 6 is an enlarged perspective view of a portion of the connector installation tool of FIG. 5.

As shown in FIG. 6, the head 34 includes a clamping tool 66. In the illustrated embodiment, the clamping tool 66 includes a frame 68, a piston or ram 70, and a stop surface 74 positioned opposite the ram 70. In the illustrated embodiment, the frame 68 is C-shaped. In the illustrated embodiment, the stop surface 74 is positioned adjacent a distal end of the head 34, while the ram 70 is positioned proximate the end of the head 34 that is coupled to the second end 22 of the body 14. The ram 70 is moveable with respect to the frame 68. In the illustrated embodiment, the ram 70 has a first or retracted position (FIG. 8) and a second or extended position (FIG. 9). In the retracted position, the ram 70 is positioned substantially within the frame 68. In the extended position, the ram 70 is protrudes from the frame 68 toward the stop surface 74. In some embodiments, the ram 70 is biased toward the retracted position such that the ram 70 moves toward the retracted position when a fluid pressure is reduced.

Figure 7:
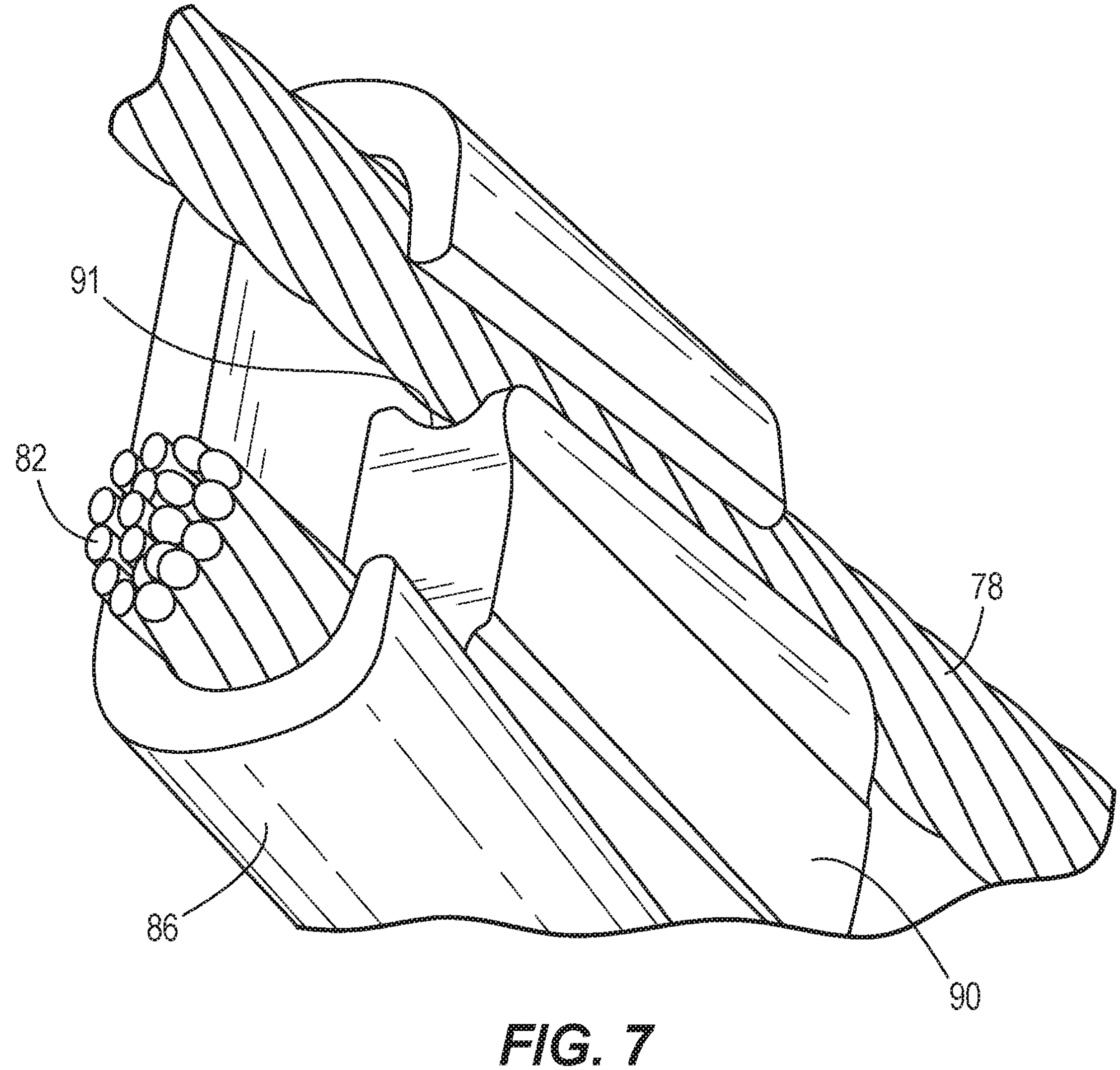
FIG. 7 is a perspective view of a connecting member and a block coupling two conductors.

The clamping tool 66 can be operated to couple a first electrical conductor 78 to a second electrical conductor 82. As shown in FIG. 7, the first conductor 78 and the second conductor 82 are positioned within a connecting member 86. The connecting member 86 may have a cross-section that is C-shaped, and one side of the connecting member 86 engages the first conductor 78 while the other side of the connecting member 86 engages the second conductor 82. The connecting member 86 is also tapered such that one end of the connecting member 86 is wider than the other end. A wedge or block 90 is positioned partially within a wider end of the connecting member 86 between the first conductor 78 and the second conductor 82. The block 90 may have a chamfer or groove 91 (FIG. 7) positioned adjacent one or both conductors 78, 82. The block 90 is insertable into the connecting member 86 toward the narrower end of the connecting member 86, thereby creating a wedge between the conductors 78, 82.

Figure 8:
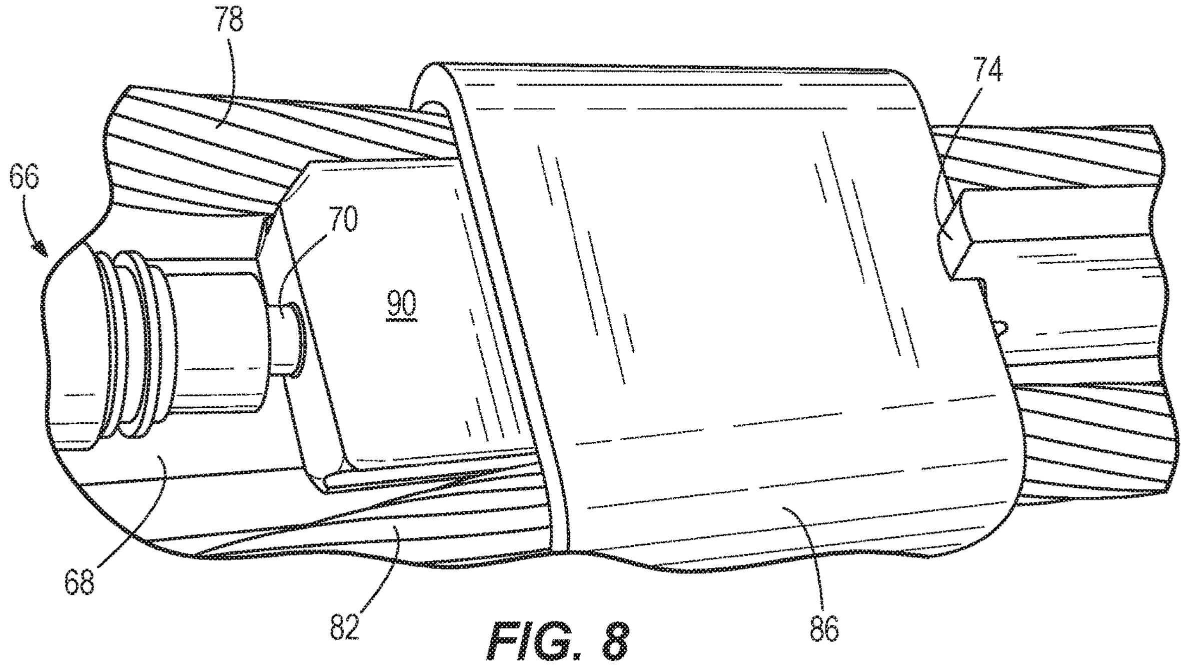
FIG. 8 is a perspective view of the tool head engaging the connecting member of FIG. 7, a piston of the tool head in a first position.
Figure 9:
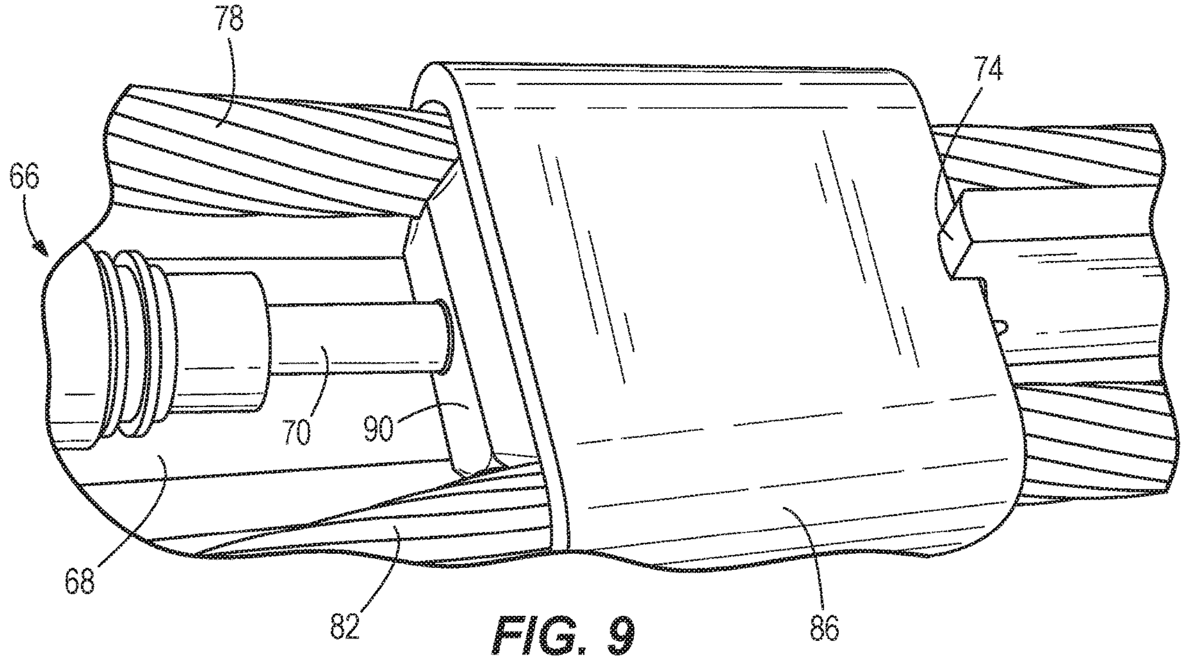
FIG. 9 is a perspective view of the tool head engaging the connecting member of FIG. 7, the piston of the tool head in a second position.

As shown in FIG. 8, to position the block 90 within the clamp member 86, the clamp member 66 is positioned adjacent the connecting member 86 so that an open section of the clamping tool 66 is adjacent an open section of the connecting member 86. In other words, an opening to the C-shaped clamping tool 66 receives an opening of the C-shaped connecting member 86 so that the C-shaped clamp member 66 is offset by 90 degrees from the C-shaped connecting member 86. The block 90 extends from the wider end of the connecting member 86 and is positioned within the opening of the clamp 66. In the illustrated embodiment, the ram 70 is positioned adjacent the block 90 and the stop surface 74 is adjacent a surface on an opposite end (i.e., the narrower end) of the connecting member 86 from the block 90.

As shown in FIG. 9, when a user actuates the trigger 50, the motor receives power, thereby powering the pump. Hydraulic fluid travels from the pump, through the hose 64, and to the head 34 and the clamping tool 66. The hydraulic fluid forces the ram 70 into the extended position. As the ram 70 extends, the ram 70 contacts the block 90. With the stop surface 74 engaging the opposite end of the connecting member 86, the ram 70 applies a force on the block 90 and translates the block 90 into the connecting member 86 and between the conductors 78, 82. In the illustrated embodiment, the clamping tool 66 may provide a slow insertion of the block 90. In other words, the ram 70 applies a force to the block 90 over a period of time (e.g., 1 millisecond, 1 second, 10 seconds, etc.) so that the block 90 a total insertion distance instantaneously (i.e., in a very short amount of time). This may help to ensure that the block 90 is properly installed.

The block 90 may continue to translate until it abuts the stop surface 74, although the block 90 is not required to abut the stop surface 74. Once the block 90 reaches a desired position (i.e., a coupling position in which the first conductor 78 to the second conductor 82 are secured within the connecting member 86), the trigger 50 may be released, thereby stopping the flow of hydraulic fluid from the pump. After the trigger 50 is released, a spring (not shown) urges the ram 70 toward the retracted position (FIG. 8). The retracting ram 70 forces the hydraulic fluid back through the hose 64 toward the reservoir. The block 90 is fit into the connecting member 86 and does not move when the ram 70 retracts.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. A connector installation tool comprising, a body having a first end and a second end;

a conduit extending between the first end and the second end;

a handle having a switch and positioned proximate the first end, the switch moveable between a first position and a second position;

a battery supported on the body and in electrical communication with the switch, a pressurized fluid configured to flow through the conduit when the switch is in the first position;

a tool head positioned proximate the second end, the tool head including a fixed stop surface and a ram, the stop surface configured to be positioned adjacent a connector, the ram being extendable in a linear manner to exert a force in a direction toward the stop surface, the ram configured to be positioned adjacent a block, the ram configured to drive the block into a wedged position in which the block is wedge coupled between two conductors positioned within the connector, the tool head is pivotable through a range of at least 180 degrees about the second end.

2. The connector installation tool of claim 1, wherein the body is an elongated body and an axis extends between the first end and the second end wherein the second end of the body includes a first projection and the tool head includes a second projection adjacent the first projection, the connector installation tool further comprising a fastener coupling the first projection and the second projection, the fastener being adjustable between a loose position in which the tool head is permitted to pivot relative to the second end of the body and a tightened position in which the tool head is secured against movement relative to the second end of the body.

3. The connector installation tool of claim 1, wherein the tool head includes a C-shaped frame.

4. The connector installation tool of claim 1, wherein the tool head is positioned at least six feet away from the first end while the tool head is connected to the second end.

5. The connector installation tool of claim 1, wherein the tool head further includes a spring configured to bias the ram away from the stop surface when the switch is in the second position.

6. The connector installation tool of claim 1, wherein the conduit extends along an outer surface of the tool body.

7. The connector installation tool of claim 1, wherein the tool head includes a frame having the stop surface, the frame is fixed relative to the linear movement of the ram, and the pivoting of the tool head is configured to move the frame and the ram together.

8. The connector installation tool of claim 1, wherein the conduit extends between an outer surface of the tool body and an outer surface of the tool head.

9. The connector installation tool of claim 1, wherein the stop surface is perpendicular to an axis along which the ram is configured to translate.

10. The connector installation tool of claim 1, wherein:

the tool head includes a C-shaped frame that includes the stop surface;

the frame is fixed relative to the linear movement of the ram; and the pivoting of the tool head is configured to move the frame and the ram together.

11. The connector installation tool of claim 1, wherein:

the second end of the body includes a first opening;

the tool head includes a second opening;

a fastener is configured to be inserted through the first opening and the second opening, the fastener being adjustable between a loose position in which the tool head is permitted to pivot relative to the second end of the body and a tightened position in which the tool head is secured against movement relative to the second end of the body; and the conduit is spaced apart from the first opening and the second opening and extends between an outer surface of the tool body and an outer surface of the tool head.

12. The connector installation tool of claim 1, wherein:

the conduit extends along an outer surface of the tool body; and the tool head includes a frame having the stop surface, the frame is fixed relative to the linear movement of the ram, and the pivoting of the tool head is configured to move the frame and the ram together.

* * * * *